United States Patent [19]

Kerimis et al.

[11] Patent Number: 4,608,407

[45] Date of Patent: Aug. 26, 1986

[54] PROCESS FOR THE PRODUCTION OF COMPRESSION-MOLDED MATERIALS CONTAINING POLYISOCYANATE BINDERS USING LATENT, HEAT ACTIVATABLE CATALYSTS

[75] Inventors: Dimitrios Kerimis, Cologne; Hanns P. Müller, Odenthal; Manfred Kapps, Bergisch-Gladbach, all of Fed. Rep. of Germany

[73] Assignee: Bayer Aktiengesellschaft, Leverkusen, Fed. Rep. of Germany

[21] Appl. No.: 632,341

[22] Filed: Jul. 19, 1984

[30] Foreign Application Priority Data

Aug. 9, 1983 [DE] Fed. Rep. of Germany ....... 3328662

[51] Int. Cl.$^4$ .................. B29J 5/00; C08G 18/18; C08L 97/02
[52] U.S. Cl. .................................... 524/14; 525/123; 528/51; 528/72; 528/75
[58] Field of Search ................ 524/13, 14, 15, 16, 524/72, 73, 74, 442, 449; 528/51, 72, 75; 264/109, 122, 125; 525/123

[56] References Cited

U.S. PATENT DOCUMENTS 3,179,627  4/1965  Twitchett ........................ 528/51
4,257,995  3/1981  McLaughlin et al. ............. 528/51
4,257,996  3/1981  Farrissey, Jr. et al. ............ 528/51
4,331,778  5/1982  Summerfeld et al. ............ 521/129

FOREIGN PATENT DOCUMENTS 2711958  9/1978  Fed. Rep. of Germany .
1387454  3/1975  United Kingdom .

*Primary Examiner*—John Kight
*Assistant Examiner*—Nathan M. Nutter
*Attorney, Agent, or Firm*—Gene Harsh; Joseph C. Gil

[57] ABSTRACT

The present invention is directed to a process for the production of compression-molded materials by the compression molding lignocellulose-containing materials mixed and/or impregnated with polyisocyanates as binder in the presence of catalysts, the improvement wherein the catalysts used are latent, heat-activatable catalysts based on ammonium salts of the type which can be obtained by reacting (i) monofunctional or polyfunctional, primary, secondary and/or tertiary amines with (ii) alkyl esters of acids of phosphorus.

or secondary and/or tertiary amines (i) with acidic alkylester of acids of phosporous (ii) under neutralization in substantially equivalent quantities.

12 Claims, No Drawings

PROCESS FOR THE PRODUCTION OF COMPRESSION-MOLDED MATERIALS CONTAINING POLYISOCYANATE BINDERS USING LATENT, HEAT ACTIVATABLE CATALYSTS

BACKGROUND OF THE INVENTION

This invention relates to a process for the production of compression-molded materials, preferably chipboards, by the compression molding of ligno-cellulose-containing starting materials mixed and/or impregnated with polyisocyanates as binder using new, latent, heat-activatable catalysts based on ammonium salts (which term includes tetraalkylammonium salts) of the type obtainable by reacting primary, secondary and/or tertiary amines with alkyl esters of acids of phosphorus exerting alkylating properties against the amines.

Compression-molded materials, such as for example chipboards, laminates or other moldings, are usually produced by compression-molding the inorganic or organic starting material (for example a mass of wood chips, wood fibers and/or other lignocellulose-containing material) with polyisocyanates, water and optionally polyols; or other binders, such as urea/formaldehyde or phenol/formaldehyde resins. The use of polyisocyanates as binder improves the stability and moisture behavior of the products and their mechanical properties. In addition, polyisocyanates as binders have significant advantages in terms of process technology, as disclosed for example in German Offenlegungsschrift No. 2,109,686.

In principle, catalysts of the type known from polyurethane chemistry (for example those mentioned on pages 26 to 29 and 31 to 33 of German Offenlegungsschrift No. 2,854,384) may also be used in conventional processes (cf. for example German Auslegeschrift No. 2,711,958) to shorten molding times. This is particularly important in the case of so-called single-platen presses. In that case, however, undesirable foaming and premature setting generally occur during the actual mixing of the components and during storage of the isocyanate-coated chips pending compression molding due to the catalytic effect which is immediately exerted upon the reactive NCO-groups. Accordingly, the compression molding process must be carried out in the absence of catalysts, i.e. over prolonged periods.

DESCRIPTION OF THE INVENTION

Accordingly, the object of the present invention is to provide a latent catalyst system which is capable of activating the reactions of polyisocyanates, such as the trimerization reaction, the urethane reaction and the NCO/water reaction as a function of temperature at elevated temperatures, but which does not show high catalytic activity at room temperature. Thus, this catalyst system may actually be added to the polyisocyanate used or to the compression-molding formulation of polyisocyanate, water, lignocellulose-containing materials (such as fibers, chips or straw-like fibers) and any polyhydroxyl compounds used, without any undesirable reactions occurring at room temperature or during mixing and storage. On the other hand, because of the catalytic effect developed at elevated temperature, the molding times may be considerably shortened through more rapid setting during compression molding.

It has now surprisingly been found that the catalysts described hereinafter based on amine salts of alkyl esters of acids of phosphorus which exhibit alkylating properties, are eminently suitable for performing the described function. Such catalysts are latent at room temperature in the polyisocyanate formulation, but catalyze the isocyanate reactions as a function of temperature at the compression-molding temperatures applied and, hence, satisfy the above-noted requirements.

The present invention more particularly relates to a process for the production of compression-molded materials, preferably wood chipboards, by the compression-molding of lignocellulose-containing materials mixed and/or impregnated with polyisocyanates as binder in the presence of catalysts, characterized in that the catalysts used are latent, heat-activatable catalysts based on ammonium salts of the type which can be obtained by reacting (i) monofunctional or polyfunctional, primary, secondary and/or tertiary amines with (ii) alkyl esters of acids of phosphorus with alkylating properties.

It is preferred that the components be reacted in substantially equivalent ratios of alkyl esters of acids of phosphorus on the one hand and primary, secondary and/or tertiary amine nitrogen atoms on the other.

The ammonium salts used in accordance with the invention are those of the type which can be obtained by reacting (i) monofunctional or polyfunctional, primary, secondary and/or tertiary amines with (ii) alkyl esters of acids of phosphorus with alkylating properties. They can also be obtained by neutralizing acidic alkylesters of phosphorus with secondary or tertiary amines in about equivalent quantities.

In principle, component (i) of the ammonium salts used in accordance with the invention may consist of any organic compound containing at least one (preferably non-aromatically bound) primary, secondary and/or tertiary amino group, which may form part of a heterocyclic ring. In such amino groups, the amine nitrogen atom is attached by three single bonds to non-aromatic carbon atoms and, optionally, hydrogen. In addition to these amino groups, the amines may contain further heteroatoms such as, for example, oxygen atoms or nitrogen atoms containing double bonds. Component (i) generally has a molecular weight of from 31 to 300 and preferably from 101 to 200.

Examples of suitable amines are methylamine; ethylamine; diethylamine; triethylamine; tri-(n-propyl)-amine; di-(n-butyl)-amine; N-methyl-N,N-di-(n-butyl)-amine; di-(isooctyl)-amine; piperidine; N-methyl piperidine; morpholine; N-methyl morpholine; permethylated diethylene triamine; diethylene triamine; triethylene diamine; diethanolamine; dipropanolamine; triethanolamine; N,N-dimethylbenzylamine; ethylene diamine; hexamethylene diamine; acyclic amidines (such as, for example, N,N'-dimethyl acetamidine) and N,N'-dicyclohexyl-N-methyl acetamidine; monocyclic amidines, such as for example 2,3-dimethyl-3,4,5,6-tetrahydropyrimidine; or bicyclic amimines, such as for example 1,5-diazabicyclo(3,4,0)non-5-ene or 1,8-diazabicyclo-(5,4,0)undec-7-ene.

In addition to the above-noted amines, heterocyclic amines of which the amine nitrogen atom is part of a heteroaromatic ring, such as for example pyridine or 1-methyl pyridine; or aromatic amines, such as for example aniline or N,N-dimethyl aniline, may also be used for producing the ammonium salts in accordance with the invention. Amines such as these are less preferable compared with the amines mentioned first.

The ammonium salts used in accordance with the invention may be obtained by reacting the amines mentioned by way of example with the phosphorus esters (ii), i.e. neutral, alkyl esters of inorganic or organic acids of phosphorus with alkylating properties against the amines (at elevated temperatures). Esters of this type include the alkyl esters (optionally containing inert substituents) of phosphoric acid, phosphorus acid and preferably of aromatic or aliphatic phosphonic acids. The alkyl esters of other acids of phosphorus, such as for example alkyl esters of phosphonic acids, phosphonous or phosphinous acids, are also suitable, although less preferred. The corresponding alkyl esters containing from 1 to 4 carbon atoms in the individual alkyl radicals are preferably used. Particularly preferred are phosphonic acid esters corresponding to the following formula

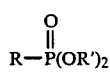

in which

R represents an aromatic hydrocarbon radical (optionally containing inert substituents) and more particularly, the phenyl radical; or an aliphatic or cycloaliphatic hydrocarbon radical and preferably an alkyl radical containing from 1 to 8 carbon atoms; and R' represents the same or different aliphatic hydrocarbon radicals, and preferably alkyl radicals containing from 1 to 8, most preferably 1–4, carbon atoms.

Typical examples of suitable phosphorus ester components (ii) include triethyl phosphite, trioctyl phosphite, diethyl phosphite, triethyl phosphate, dimethyl benzyl phosphate, trimethyl phosphite, trimethyl phosphate, benzene phosphonic acid dimethyl ester, p-toluene phosphonic acid diethyl ester, methane phosphonic acid dimethyl ester, n-butane phosphonic acid diethyl ester, ethane phosphonic acid diethyl ester, ethane phosphonic acid diethyl ester, ethane phosphonic acid dimethyl ester and the like.

The catalyst essential to the invention and their production are known (Houben-Weyl, Vol. XII/2, pages 262 et seq). The catalysts may be produced, for example, by reacting the individual components, namely amines (i) and phosphorus esters (ii), with one another in such a way that, in the final product, virtually all the amine nitrogen atoms have been alkylated by the phosphorus ester. This means that the reaction takes place in a molar ratio of amino groups to alkyl ester of approximately 1:1 (where amidines are used, the nitrogen atom containing a double bond does not enter into the calculation). To form the ammonium salts used in accordance with the invention, component (ii) may be used in an excess of any order which is removed, for example by distillation, preferably on completion of the alkylation reaction. An excess of the phosphorus ester (ii) may even remain (as solvent) in the ammonium salts used in accordance with the invention. The individual components (i) and (ii) are preferably reacted for about 0.5 to 15 hours at temperatures in the range from 50° to 200° C. and preferably at temperatures in the range from 80° to 180° C. In general, the reaction is carried out by boiling the reactants under reflux. In many cases, it is of advantage to carry out the reaction in an inert gas atmosphere and/or under pressure. The reaction times and temperatures are of course primarily determined by the reactivity of the particular individual components (i) and (ii) used. Where monofunctional, readily volatile amines are used, they may of course also be used in excess and the remaining excess may subsequently be separated from the reaction product by distillation. If the excess amines (i) are not separated off from the ammonium salt, they will act as additional amine catalysts, which is also an embodiment of the process according to the invention.

Instead of being produced by alkylation of the amine component (i), as described in the foregoing, the catalysts used in accordance with the invention may also be produced by neutralizing suitable amines with monobasic acid esters of acids of phosphorus, in which case it is preferred to use equivalent quantities of components (i) and (ii). Since the ammonium salts used in accordance with the invention contain only quaternary ammonium ions as cations, it is only possible where the method of produolicn by neutralization is adopted, to use amines of the type which contain only secondary and/or tertiary amino groups. Suitable neutralizing agents for use in this method of producing the catalyst used in accordance with the invention include monobasic acid esters of phosphoric acid, such as for example diethyl phosphate, di-(n-propyl)-phospate, di-(n-butyl)-phosphate or di-(n-octyl)-phosphate.

In one embodiment of the invention, the catalysts are formed in situ during preparation of the polyurethane-forming reaction mixture, for example by dissolving the amine in the aqueous phase and/or polyol phase and the acidic, monobasic phosphorio acid ester in the polyisocyanate component, so that when the two reactive components are combined to form the aqueous polyisocyanate binder dispersion, the catalyst used in accordance with the invention is formed by an instantaneous neutralization reaction. Where the catalysts according to the invention are produced by a neutralization reaction, the observations made earlier with respect to the quantitative ratios apply in the same way. In this case, too, a more readily volatile component (optionally used in excess) may be separated from the reaction product by distillation on completion of the reaction. Where the catalysts are produced in situ, equivalent quantities of the reactants are preferably used. The neutralization reaction may of course be carried out at room temperature.

The catalysts used in accordance with the invention are generally colorless to yellow, odorless liquids or low-melting crystalline compounds which show no significant catalytic activity in regard to the isocyanate addition reaction at temperatures below 30° C. and preferably at temperatures below 20° C. It is only at temperatures above 60° C. and, more particularly, at temperatures in the range from 90° to 150° C. and preferably at temperatures in the range from 90° to 30° C. that the catalysts used in accordance with the invention develop a pronounced catalytic effect. Thus, the stability in storage of reaction mixtures of polyisocyanates and polyols containing catalysts used in accordance with the invention is only slightly lower than that of corresponding, uncatalyzed reaction mixtures at the low temperatures mentioned and strong acceleration of the isocyanate addition reaction occurs at higher temperatures within the ranges mentioned above.

The following are particularly preferred examples of the catalysts used in accordance with the invention:

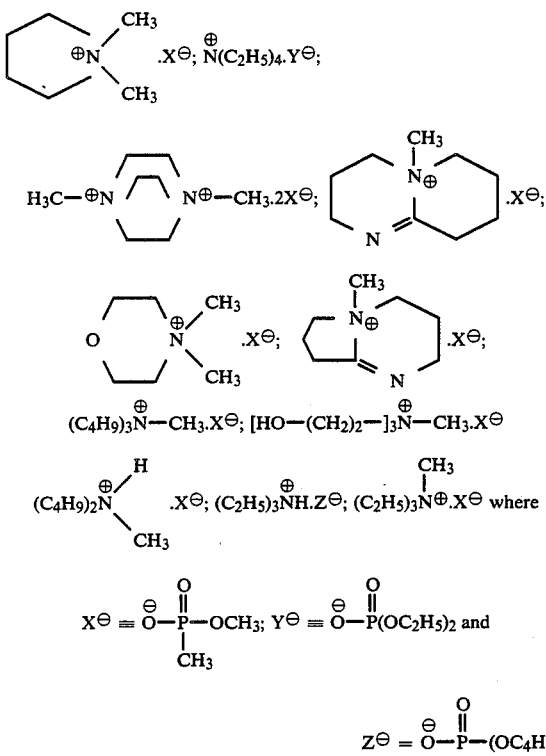

(C₄H₉)₃N⊕—CH₃.X⊖; [HO—(CH₂)₂—]₃N⊕—CH₃.X⊖

$(C_4H_9)_2\overset{\oplus}{N}\overset{H}{\underset{CH_3}{\diagup}}.X^\ominus$; $(C_2H_5)_3\overset{\oplus}{N}H.Z^\ominus$; $(C_2H_5)_3\overset{\oplus}{N}\overset{CH_3}{\underset{}{|}}.X^\ominus$ where $$X^\ominus = \overset{O}{\underset{CH_3}{\overset{\ominus}{O}-\overset{\|}{P}-OCH_3}}; \quad Y^\ominus = \overset{O}{\overset{\ominus}{O}-\overset{\|}{P}(OC_2H_5)_2} \text{ and}$$

$$Z^\ominus = \overset{O}{\overset{\ominus}{O}-\overset{\|}{P}-(OC_4H_9)_2}$$

$Y^\ominus$, $Y^{63}$ and Z may be also exchanged inter se. The amino salts may be prepared, for example, from the corresponding (tertiary) amines and methyl phosphonic acid dimethylester, triethylphosphate or dibutyl phosphate.

The catalysts according to the invention may optionally be used in solution in mono- or polyfunctional, relatively long chain or short-chain hydroxyl compounds, although they may also be dissolved in excess starting components (i) and, more preferably, (ii). The catalysts according to the invention may of course also be dissolved in modified polyisocyanate binders, for example in aqueous polyisocyanate emulsions, of the type formed where emulsifiers such as, for example, polyethylene glycols, glue, polyvinylpyrrolidone, polyacrylamides (which optionally contain polyethylene dispersions) and wood preservatives, are added to the polyisocyanates, or in modified polyisocyanates of the type which have been hydrophilized by modification with monofunctional polyethylene oxide derivatives or by the addition of phosphorus or sulfonic acids.

The isocyanate component used in the process according to the invention may be any of the aliphatic, cycloaliphatic, araliphatic, aromatic and heterocyclic polyisocyanates, examples of which have been described by W. Siefken in Justus Liebigs Annalen der Chemie, 562 pages 75 to 136. Specific examples include those corresponding to the following formula Q(NCO)$_n$ in which
n=2 to 4, preferably 2, and
Q represents an aliphatic hydrocarbon radical containing from 2 to 18 carbon atoms and preferably from 6 to 10 carbon atoms; a cycloaliphatic hydrocarbon radical containing from 4 to 23 carbon atoms and preferably from 5 to 13 carbon atoms; an aromatic hydrocarbon radical containing from 6 to 23 carbon atoms and preferably from 6 to 13 carbon atoms; or an araliphatic hydrocarbon radical containing from 8 to 15 and preferably from 8 to 13 carbon atoms. Specific isocyanates include for example, 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of such isomers 1-isocyanato-3,3,5-trimethyl-5-isocyanatomethyl cyclohexane; 2,4- and 2,6-hexahydrotolylene diisocyanate and mixtures of such isomers; hexahydro-1,3- and/or 1,4-phenylene diisocyanate; perhydro-2,4'- and/or -4,4'-diphenylmethane diisocyanate; 1,3- and 1,4-phenylene diisocyanate; 2,4-and 2,6-tolylene diisocyanate and mixtures of such isomers; diphenylmethane-2,4'- and/or -4,4'-diisocyanate; naphthylene-1,5-diisocyanate, and the like.

Other suitable isocyanate components include, for example triphenylmethane-4,4',4''-triisocyanate; polyphenyl polymethylene polyisocyanates of the type obtained by phosgenating aniline-formaldehyde condensates and described, for example, in British Pat. Nos. 874,430 and 848,671; m- and p-isocyanatophenyl sulfonyl isocyanates perchlorinated aryl polyisocyanates; polyisocyanates containing carbodiimide groups; norbornane diisocyanate; polyisocyanates containing allophanate groups, polyisocyanates containing isocyanurate groups; polyisocyanates containing urethane groups; polyisdcyanates containing acylated urea groups; polyisocyanates containing biuret groups; polyisocyanates produced by telomerization reactions; polyisocyanates containing ester groups; reaction products of the above-mentioned isocyanates with acetals; and polyisocyanates containing polymeric fatty acid esters.

In addition, mixtures of the above-mentioned polyisocyanates may also be used.

In general, it is particularly preferred to use commercially available polyisocyanates, such as, for example, 2,4- and 2,6-tolylene diisocyanate and mixtures of such isomers ("TDI"); polyphenyl-poly-methylene polyisocyanates of the type obtained by phosgenating aniline-formaldehyde condensates ("crude MDI"); and "modified polyisocyanates", i.e. polyisocyanates optionally containing—through further modification reactions—carbodiimide groups, urethane groups (for example by reaction with substoichiometric quantities of low molecular weight di- and/or polyols), allophanate groups, isocyanurate groups, urea groups, and biuret groups; and particularly modified polyisocyanates derived from 2,4- and/or 2,6-tolylene diisocyanate; or 4,4'- and/or 2,4'- and/or 2,2'-diphenylmethane diisocyanate. The optionally modified, binuclear or polynuclear polyisocyanates based on polyphenyl-polymethylene polyisocyanates may also be used in admixture with the diphenylmethane diisocyanates. Other suitable isocyanates are those of the type described in German Offenlegungsschrift No. 27 11 958. Binuclear and polynuclear crude polyisocyanate mixtures of the type obtained by distillation from the crude phosgenation products of the formaldehyde/aniline condensate-amine mixtures, or crude MDI mixtures of the type obtained by distilling off some of the diphenyl methane diisocyanate fractions may also be used.

The process according to the invention may also be carried out with prepolymers containing terminal isocyanate groups and having molecular weights of from 300 to 2000, of the type obtained in known manner by reacting relatively high molecular weight and/or low molecular weight polyols with an excess of polyisocyanate. Relatively high molecular weight polyols suitable for this purpose include, in particular, compounds containing from 2 to 8 hydroxyl groups and particularly those having molecular weights of from 400 to 10,000 and preferably from 600 to 5000. Examples include polyesters, polyethers, polythioethers, polyacetals, polycarbonates and polyester amides containing at least 2, generally 2 to 8, but preferably 2 to 4 hydroxyl groups, of the type known for the production of cellular and non-cellular polyurethanes.

The polyesters containing hydroxyl groups suitable for use in accordance with the invention include, for example, reaction products of polyhydric, preferably dihydric or trihydric alcohols, with polybasic, preferably dibasic, aliphatic, cycloaliphatic, aromatic and/or heterocyclic carboxylic acids, their esters or anhydrides.

Suitable polyhydric alcohols include for example ethylene glycol, 1,2- and 1,3-propane diol, 1,4- and 2,3-butane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol and sorbitol, formitol, methyl glycoside, di-, tri-, tetra-, and higher polyethylene glycols, di-, tri-, tetra- and higher polypropylene glycols and di-, tri-, tetra- and higher polybutylene glycols. The polyesters may also contain terminal carboxyl groups. Polyesters of lactones, for example ε-caprolactone, or of hydroxycarboxylic acids, for example, ω-hydroxycaproic acid, may also be used.

The polyethers containing at least 2, generally 2 to 8 and preferably 2 to 3 hydroxyl groups which may be used in accordance with the invention are also known and are obtained, for example, by polymerizing tetrahydrofuran or epoxides, such as ethylene oxide, propylene oxide, butylene oxide, styrene oxide or epichlorohydrin, for example in the presence of Lewis catalysts, such as $BF_3$, or by the addition of these epoxides (preferably ethylene oxide or propylene oxide) optionally in admixture or successively, onto starter components containing reactive hydrogen atoms. Suitable starter components include water, alcohols, ammonia or amines. Suitable alcohols and/or amines include ethylene glycol, 1,3- or 1,2-propane diol, trimethylol propane, glycerol, sorbitol, 4,4'-dihydroxy diphenyl propane, aniline, ethanolamine or ethylene diamine. Sucrose polyethers of the type described, for example, in German Auslegeschriften Nos. 11 76 358 and 10 64 938, and formitol- or formose-started polyethers (German Offenlegungsschriften Nos. 26 39 083 and 27 37 951) may also be used in accordance with the invention. In many cases, it is preferred to use polyethers which predominantly contain primary OH-groups (up to 90% by weight, based on all the OH-groups present in the polyether). Polybutadienes containing OH-groups may also be used in accordance with the invention.

Among the polythioethers, reference is made in particular to the condensation products of thiodiglycol on its own and/or with other glycols, dicarboxylic acids, formaldehyde, aminocarboxylic acids or amino alcohols.

Suitable polyacetals are, for example, the compounds obtainable from diols and formaldehyde or by the polymerization of cyclic acetals.

Suitable polycarbonates containing hydroxyl groups are those known in the art.

Polyhydroxyl compounds already containing urethane or urea groups and optionally modified natural polyols, such as castor oil, or carbohydrates, for example, starch, may also be used. Adducts of alkylene oxides with phenol-formaldehyde resins or even with urea-formaldehyde resins may also be used in accordance with the invention.

In addition to the ammonium compounds used in accordance with the invention, it is also possible in accordance with the invention to use other catalysts known from polyurethane chemistry, for example of the type described on pages 26 to 29 and 31 to 33 of German Offenlegungsschrift No. 28 54 384, generally in a quantity of from 5 to 100% by weight, based on the ammonium compounds used in accordance with the invention.

Suitable co-catalysts include, for example, tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-diethylbenzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethyl imidazole, 2-methyl imidazole. Other suitable co-catalysts are Mannich bases known per se of secondary amines, such as dimethylamine, and aldehydes, preferably formaldehyde, or ketones, such as acetone, methylethyl ketone or cyclohexanone, and phenols, such as phenol, nonyl phenol or bisphenol.

Tertiary amines containing isocyanate-reactive hydrogen atoms suitable for use as catalysts include, for example, triethanolamine, triisopropanolamine, N-methyl diethanolamine, N-ethyl diethanolamine, N,N-dimethyl ethanolamine, and also reaction products thereof with alkylene oxides, such as propylene oxide and/or ethylene oxide.

Other suitable co-catalysts are silaamines containing carbon-silicon bonds of the type described, for example, in DE-PS No. 1,229,290 (corresponding to U.S. Pat. No. 3,620,984), for example 2,2,4-trimethyl-2-silamorpholine and 1,3-diethylaminomethyl tetramethyl disiloxane.

Other suitable co-catalysts are nitrogen-containing bases, such as tetra-alkyl ammonium hydroxides, also alkali hydroxides, such as sodium hydroxide, alkali phenolates, such as sodium phenolate, or alkali alcoholates, such as sodium methylate. Hexahydrotriazines may also be used as catalysts. Organometallic compounds, particularly organotin compounds, may also be used as catalysts. Preferred organotin compounds are tin-(II) salts of carboxylic acids, such as tin-(II) acetate, tin-(II) octoate, tin-(II) ethylhexoate and tin-(II) laurate, and tin-(IV) compounds, for example dibutyl tin oxide, dibutyl tin dichloride, dibutyl tin diacetate, dibutyl tin dilaurate, dibutyl tin maleate or dioctyl tin diacetate. All the catalysts mentioned may of course also be used in admixture with one another.

Further representatives of catalysts suitable for use in accordance with the invention and information on the way in which they work can be found, for example, in Kunststoff-Handbuch, Vol. VII, by Vieweg and Hochtlen, Carl-Hanser-Verlag, Munich, 1966, for example on pages 96 to 102.

As already mentioned, the ammonium compounds according to the invention are used with polyisocyanate binders for lignocellulose-containing raw materials. In this connection, favorable results have also been obtained using polyisocyanate components as described in German Auslegeschrift No. 27 11 958. Such polyisocyanate is the phosgenation product of the non-distilled bottom fraction accumulating during the removal of 25 to 90% by weight and preferably from 30 to 85% by weight of 2,2'-, 2,4'-, and/or 4,4'-diaminodiphenylmethane from an aniline/formaldehyde condensate. Also useful is the non-distilled bottom fraction accumulating during the removal of 25 to 90% by weight and preferably from 55 to 85% by weight of 2,2'-, 2,4'- and/or 4,4'-diisocyanatodiphenylmethane from the crude phosgenation product of an aniline/formaldehyde condensate. Such isocyanate components contain from 35 to 70% by weight and preferably from 45 to 60% by weight of diisocyanatodiphenyl methanes, the 2,4'-diisocyanatodiphenylmethane content amounting to between 1 and 8% by weight and preferably to between 2 and 5% by weight and the 2,2'-diisocyanatodiphenylmethane content to between 0 and 2% by weight and the isocyanate components have a viscosity at 25° C. of from 50 to 600 mPa.s, preferably from 100 to 300 mPa.s, and NCO-contents of from 28 to 32% by weight.

As can be seen from the foregoing, such bottom fractions accumulate during the removal of from 45 to 90% by weight and preferably from 55 to 85% by weight of diisocyanatodiphenylmethanes from a crude diphenyl methane diisocyanate (crude MDI) which contains more than 85% by weight and preferably more than 90% by weight of 4,4'-diisocyanatodiphenylmethane. A crude diphenylmethane diisocyanate such as this can be obtained, for example, by the process according to German Offenlegungsschrift No. 23 56 828.

Another possibility is to distill off from 25 to 80% by weight and preferably from 30 to 60% by weight of 2,4-diisocyanatodiphenylmethane and, optionally, 4,4'- or 2,2'-diisocyanatodiphenylmethane from a crude phosgenation product containing from 60 to 90% by weight and preferably from 65 to 75% by weight of diisocyanatodiphenylmethane isomers (20 to 60% by weight and preferably 30 to 40% by weight of 2,4'-isomers). In either case, distillation may be carried out in such a way that residue has the composition indicated above.

It is of course also possible (and, in many cases, even simpler in practice), however, to obtain the required isomer and oligomer composition of the polyisocyanate mixture by blending various bottom fractions.

In addition to the preferred, unmodified polyisocyanates, it is also possible to use polyisocyanates which have been modified for self-release. Polyisocyanates such as these modified to obtain a self-releasing effect are described, for example, in German Offenlegungsschrift No. 31 09 317 (U.S. Pat. No. 4,258,169), in German Offenlegungsschrift No. 29 32 175 (U.S. Pat. No. 4,257,995) and in U.S. Pat. No. 4,257,996, where polyisocyanates are modified with phosphorus compounds. The modification of polyisocyanates with from 0.1 to 30% by weight of phosphoric acid-$C_1$-$C_7$-dialkyl esters, preferably phosphoric acid di-n-butyl ester, is described in German Patent Application P No. 31 08 538. Other polyisocyanate/binder mixtures are described in European Patent Application A No. 7532 and in European Patent No. 13112.

Suitable lignocellulose-containing raw materials which may be bonded with the polyisocyanate-activator formulation according to the invention include, for example, wood, bark, cork, bagasse, straw, flax, bamboo, alpha grass, rice husks, sisal and coconut fibers. The material may be present in the form of granulates, chips, fibers or powder and may have a water content of, for example, from 0 to 35% by weight and preferably from 5 to 25% by weight. It is admixed with the binder used in accordance with the invention in a quantity of from 1 to 100% by weight and preferably in a quantity of from 2 to 12% by weight and molded, generally under heat and pressure, to form boards or moldings.

It is of course also possible in accordance with the invention to produce compression moldings from other organic raw materials (for example plastics waste of all kinds) and/or inorganic raw materials (for example, expanded mica or silicate beads).

The material to be compression-molded can be mixed with the binder, preferably by spraying with the binder according to the invention, in order thus to obtain as homogeneous a distribution as possible.

In practice, delays may occur between the individual process stages (preparation of the formulation; spraying of the material to be used) and due to errors in procedure or due to readjustment of the process conditions. However, the acceleration of the isocyanate reactions by the catalysts according to the invention desirably takes place sufficiently slowly at room temperature, so that a delay of at least 2 hours to several hours between preparation of the isocyanate-activator formulation and compression molding is acceptable. The reaction velocity may be further decelerated by altering the reactivity of the polyisocyanates. For example, the reaction velocity may be distinctly reduced by increasing the proportion of 2,4'- and/or 2,2'-diphenylmethane diisocyanate (in relation to the 4,4'-isomer).

Multilayer boards or moldings of veneers, papers or fabrics may also be similarly produced. Multilayer boards or moldings of veneers and strip-like, rod-like or rodlet-like center layers, so called joinery boards, may also be produced in accordance with the invention by treating the veneers as described above with the isocyanate-activator formulation and subsequently compression-molding them with the center layers, generally at elevated temperature and pressure. The temperatures applied are preferably in the range from 80° to 250° C. and, more preferably, in the range from 100° to 220° C. In this case, too, the initial pressure is preferably in the range from 5 to 150 bars, generally falling towards zero in the course of compression molding.

According to the invention, the polyisocyanate activator formulations may also be used in combination with the polyhydroxyl compounds described above in an NCO:OH ratio of from 1.1:1 to 10:1 and preferably from 1.5:1 to 5:1. In this connection, it is possible to use the two components either separately or in the form of a reactive mixture. Combinations such as these of polyisocyanate and polyhydroxyl compounds have acquired practical significance as binders, for example in the bonding of granulated cork. It is also possible to add known blowing agents in a quantity of from about 0.5 to 30% by weight, based on binder or impregnating agent and/or other additives (such as stabilizers) which influence foam formation or the chemical reaction between polyisocyanates, lignocellulose-containing material and, optionally, polyhydroxyl compounds, in a quantity of from 0.05 to 10% by weight, based on binder or impregnating agent.

The polyisocyanate-activator formulations used as binders in accordance with the invention may also be combined with aqueous solutions of condensates of formaldehyde with urea and/or melamine and/or phenol which have hitherto mainly been used in the wood-based materials industry. The formulation may also be blended with other, hitherto less widely used binders and impregnating agents, such as for example, sulfite waste liquor (lignin sulfonate or other technical lignin solutions from the digestion of wood) or tanning-like compounds, such as tannin. In such cases, the binders according to the invention may be mixed with these additional binders in a ratio of from 1:10 to 10:1 and preferably in a ratio of from 1:5 to 5:1, the binders according to the invention and the additional binder either being used separately or even in admixture.

Combinations such as these are particularly advantageous in the production of multilayer boards having special properties. For example, conventional adhesives (either on their own or together with the polyisocyanate binder) may be added to the outer layers while the polyisocyanate binders used in accordance with the invention (on their own or together with conventional adhesives) may be added to one or more inner layers, followed by compression molding.

In the manufacture of chipboards, particularly multilayer chipboards, the problem often arises of completely reacting the chips, even in the center layers of the chipboards, with the polyisocyanate binders in very short compression molding times. The advantages of the latent, heat-activatable catalysts according to the invention is particularly valuable insofar as it is precisely in the center layers where the catalyst is used, so that setting is accelerated there, although the center layer is inevitably heated from the outside. The high temperature coming from the mold initially heats the surface layers to a considerable extent and produces a surge of steam which transmits the temperature (just above 100° C.) into the interior of the chipboards. Even at that temperature, the catalyst-containing polyisocyanate binders then react in the center layer in a distinctly shorter time. A further significant reduction at this time probably cannot be obtained because the transfer of heat into the center layer cannot take place any faster. Accordingly, it is preferred to activate the center layer in accordance with the invention and to formulate the surface layers without any catalyst.

However, the surface-layer coating of the chips may also be carried out with activator-containing polyisocyanates, although this does not involve any significant changes because the effect essential to the outcome is adequate binding in the center layer. In practice, the adequate binding of the chips in the layers is determined by measuring the thickness or increase in thickness of the boards formed after leaving the press.

By virtue of their outstanding mechanical properties, the boards or moldings produced in accordance with the invention from lignocellulose-containing or other organic and/or inorganic starting materials are suitable for use in building construction. In order to provide the boards or moldings with the fungicidal, insecticidal or flameproof properties generally required in that field, the usual commercially available additives, for example aqueous polyethylene emulsions, organic or inorganic inhibitors, may be added to the binders or to the starting materials either in pure form or in the form of solutions in quantities of from about 0.05 to 30% by weight and preferably in quantities of from 0.5 to 20% by weight, based on the material as a whole. Suitable solvents are water or organic solvents, for example residual oils from petroleum refining, chlorinated hydrocarbons, and the like. The quality of bonding is generally not affected by solvents such as these. In contrast to phenol/formaldehyde-resin-bonded boards, there is advantageously no efflorescence of salts nor "bleeding" in the materials produced in accordance with the invention.

By virtue of the high bond strength of the binders according to the invention, moldings impregnated or bonded therewith frequently tend to adhere to the surfaces of the hot presses or molds. This can be avoided by means of release agents added to the binder. Another solution is to apply the release agents in pure form or in the form of a solution to the metal surfaces which come into contact with the pressings or to the surface of the moldings. Suitable external release agents are any of the substances hitherto proposed for this purpose. However, it is preferred in accordance with German Offenlegungsschrift No. 23 25 926 to use compounds which, in the case of isocyanates, catalyze isocyanurate formation. Examples of such materials include, for example, phenol-Mannich bases, derivatives of hexa-hydrotriazine or alkali metal salts of carboxylic acids and/or soaps, optionally in solution, such as for example aqueous diethylene glycol. Another method of eliminating adhesion is to arrange a parting layer between the pressing and the metal surface of the press. The parting layer may consist of webs, films or size-reduced forms of various raw materials (for example plastics, paper, wood, metals). As already mentioned, significant improvements in chipboard manufacture both in regard to mechanical properties and also in regard to process technology may be obtained with the isocyanate binders used in accordance with the invention over conventional binders based on phenol/formaldehyde or urea/formaldehyde resins. Thus, it is possible in the case of wood chipboards to increase stiffness in flexure by up to 50% (in addition to improving other mechanical properties) for the same quantity of binder as in the case of phenol/formaldehyde or urea/formaldehyde resins or to obtain an equally broad spectrum of mechanical properties for a binder concentration reduced by around 25 to 70%. These optimal material properties are obtained in particular when a polymethylene-polyphenyl polyisocyanate having the viscosity and isomer distribution defined above is used as binder.

The invention is illustrated by the following Examples in which the figures quoted represent parts by weight and percentages by weight, unless otherwise indicated.

The ammonium salts used in accordance with the invention as employed in the following Examples were produced as follows:

Ammonium salt I

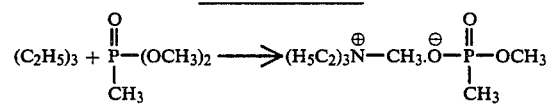

101 by weight of triethylamie and 248 parts by weight of methane phosphonic acid dimethyl ester are mixed and the resulting mixture gently refluxed with stirring for 8 hours. Excess methane phosphonic acid ester is then distilled off in vacuo. 140 parts by weight of a yellow viscous liquid are obtained.

Ammonium salt II

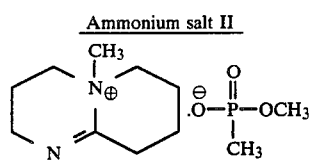

124 parts of methane phosphonic acid dimethyl ester and 77.5 parts of 1,8-diazabicyclo(5,4,0)undec-7-ene are stirred for 5 hours at 100° C. Excess phosphonic acid ester is then distilled off in vacuo. 140 parts of a yellow, medium-viscosity liquid are obtained.

Ammonium salt III

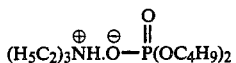

210 parts by weight of dibutyl phosphate and 303 parts by weight of triethylamine are mixed and the resulting mixture gently refluxed with stirring for 8 hours. The excess triethylamine is then distilled off in vacuo. 266 parts by weight of a colorless, low-viscosity liquid are obtained.

Ammonium salt IV

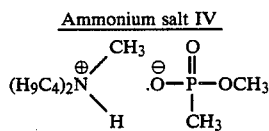

258 parts by weight of dibutylamine and 248 parts by weight of methane phosphonic acid dimethyl ester are mixed and heated with stirring to 135°–150° C. The mixture is then cooled with an ice bath to such an extent that the temperature is kept at 140°–150° C. by the exothermic reaction. The reaction mixture is then stirred for another 5 hours at 150° C. The product obtained is freed from unreacted starting products by distillation in vacuo. 350 parts by weight of a colorless, viscous liquid slowly crystallizing at room temperature are obtained.

Ammonium salt V

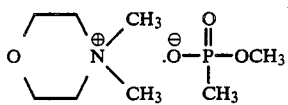

The procedure is the same as for ammonium salt I, except that an equivalent quantity of N-methyl morpholine is used instead of triethylamine.

Ammonium salt VI

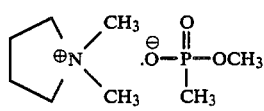

The procedure is the same as for ammonium salt I, except that an equivalent quantity of N-methyl pyrrolidone is used instead of the triethylamine.

Ammonium salt VII

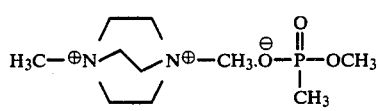

123 parts by weight of triethylene diamine and 1240 parts by weight of methane phosphonic acid dimethyl ester are stirred for 8 hours at 100° C. while a gentle stream of nitrogen is passed through. Approximately 400 parts by weight of excess methane phosphonic acid ester are then distilled off in vacuo, the product precipitated is filtered off and dried in vacuo. 335 parts by weight of a colorless, crystalline compound are obtained.

Ammonium salt VIII

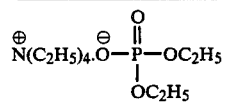

202 parts by weight of triethylamine and 1820 parts by weight of triethyl phosphate are gently refluxed with stirring for 8 hours while a gentle stream of nitrogen is passed through. The unreacted starting compounds are then distilled off in vacuo. 110 parts by weight of a colorless, medium-viscosity liquid which solidifies very slowly are obtained.

Ammonium salt IX

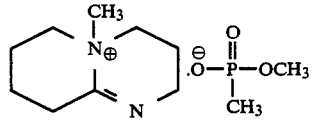

220 parts by weight of 1,5-diazabicyclo[3,4,0] non-5-ene and 446 parts by weight of methane phosphonic acid dimethyl ester are stirred for 5 hours at 110° C. while a gentle stream of nitrogen is passed through. Unreacted starting compounds are then distilled off in vacuo. 410 parts by weight of an amber-colored viscous liquid are obtained.

Ammonium salt X

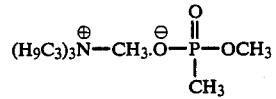

37 parts by weight of tri-n-butylamine and 124 parts by weight of methane phosphonic acid dimethyl ester are stirred for 8 hours at 180° C. while a gentle stream of nitrogen is passed through. The excess phosphorus ester is then distilled off in vacuo. 62 g of a colorless, medium-viscosity liquid are obtained.

The structure of the ammonium compounds mentioned above were confirmed by NMR-spectroscopy.

It is particularly preferred to use reaction products of methane phosphonic acid dialkyl esters with di- or trialkylamines.

EXAMPLES

EXAMPLE 1

130 parts of polyisocyanate (Bayer PU-1520A; a polyisocyanate mixture based on polymethylene-polyphenyl polyisocyanates) having an NCO-content of 30% and a viscosity of 200 mPa.s/25° C. and containing, 0.5 1 and 2% of catalysts I, II and IV respectively, are added to 2250 parts by weight of chips consisting of a mixture of softwood and hardwood and having a moisture content of 10%. The catalysts were added to the polyisocyanate in the form of a 50% solution in diethylene glycol mono-n-butyl ether. These coated, activator-containing chips which can be stored for at least 1 to 2 hours at room temperature are used for the center layer of a chipboard.

Three layer moldings are formed from surface layers (980 parts of wood chips having a moisture content of 15%) coated with activator-free polyisocyanate, 55 parts (Bayer PU-1520A) and the chips coated with polyisocyanate/activator for the middle layer on a steel plate which had been treated beforehand with an aqueous potassium/diethylene glycol solution as external release agent. The surface of the moldings was also wetted with release-agent solution, followed by compression molding at a heating plate temperature of 170° C. The V 100 transverse tensile strength of the chipboards obtained (thickness 16 mm) is determined at 170° C. in accordance with DIN No. 68 763 after various compression-molding times (see Table 1).

TABLE 1

| V 100 transverse tensile strength of chipboards | | |
|---|---|---|
| Catalyst in the middle layer | Compression molding time at 170° C. | |
| (%, based on polyisocyanate) | 3.2 mins | 1.6 mins |
| without catalyst (comparison) | 0.28 MPa | 0.20 MPa |
| 0.5% of catalyst I | 0.28 MPa | 0.25 MPa |
| 1.0% of catalyst II | 0.28 MPa | 0.25 MPa |
| 2.0% of catalyst IV | 0.30 MPa | 0.26 MPa |

Result

The compression molding time can be shortened by the addition of catalysts according to the invention.

EXAMPLE 2

The latency and heat activatability of the catalysts according to the invention.

Catalysts I, II, IV, V, VIII, IX and X as listed in Table 2 are dissolved in the quantities indicated in a mixture of tolylene diisocyanate (80:20 isomer mixture of 2,4- and 2,6-tolylene diisocyanate) containing 7.5% by weight of wood chips (moisture content of the chips 8%). Solid catalysts were added to the diisocyanate in the form of 80% solutions in methane phosphonic acid dimethyl ester. The time taken for the mixture to harden was measured at various temperatures.

As can be seen from the results set out in Table 2, the catalysts according to the invention have a pot life at room temperature of up to 50 hours (depending on their concentration), whereas in the presence of heat (100° C.) they lead very quickly to hardening of the isocyanate mixture, i.e. the latent catalysts are activated by heat. By contrast, highly active catalysts, particularly for the trimerization of diisocyanates, lead to hardening almost immediately or in a very short time both at room temperature and also at 100° C. Although less active catalysts of the prior art also produce slow hardening at room temperature, the hardening time again cannot be reduced to any significant extent by heating to 100° C., as is the case with the heat-activatable catalysts according to the invention.

TABLE 2

| Catalyst Ammonium salt No. | In T-80 containing 75% of woodchips quantity in % | Beginning of hardening at °C. after mins. | |
|---|---|---|---|
| | | 20° C. | 100° C. |
| VIII | 0.5 | 1 h | immediate |
| | 0.25 | 1 h 30' | immediate |
| | 0.1 | at least 20 h* | 3' |
| IV | 2 | 20' | immediate |
| | 0.5 | 7 h | 1' |
| | 0.25 | at least 10 h* | 1–2' |
| | 0.1 | at least 50 h* | 15' |
| I | 0.5 | 2' | immediate |
| | 0.25 | 3' | immediate |
| | 0.1 | 10–15' | immediate |
| V | 0.5 | 15' | immediate |
| | 0.25 | 20' | immediate |
| | 0.1 | 35' | immediate |
| IX | 0.5 | 1–3' | immediate |
| | 0.25 | 2–5' | immediate |
| | 0.1 | 5 h | 2.5–5' |
| II | 0.5 | 1' | immediate |
| | 0.25 | 1' | immediate |
| | 0.1 | 42–52' | immediate |
| X | 0.5 | 4' | immediate |
| | 0.25 | 10' | immediate |
| | 0.1 | 45–55' | immediate |

*Terminated after the period indicated

EXAMPLE 3

Change in thickness of 16 mm laboratory chipboards as a function of the compression molding time at a compression molding temperature of 200° C.

Both in industry and also in the laboratory, the change in thickness of the chipboards as measured after compression molding is an indication of the shortest possible compression molding time. If, after compression molding, the thickness of the boards increases beyond the basic, stipulated thickness, the gross density and strength value of the boards are distinctly reduced.

For economic reasons, however, a possible reduction in the compression molding time is of considerable interest. This possibility clearly exists where the catalysts according to the invention are used in the polyisocyanate binder in contrast to non-catalyzed polyisocyanate binders (see Table 3). As the results set out in Table 3 show, the use of the catalysts according to the invention reduces the minimum compression-molding time, i e the shortest possible compression molding time, to approximately 75% of the minimum compression molding time where non-catalyzed polyisocyanate binders are used, the use of the latent catalysts according to the invention having no effect on the processing time of the polyisocyanate-coated chips before compression molding.

TABLE 3

| Compression molding time at 200° C. (in secs/mm- final thickness of the chipboard) | Board thickness after compression molding | |
|---|---|---|
| | without catalyst | 1% of catalyst |
| 12 | 15.9 mm | 15.9 mm |
| 10 | 15.9 mm | 15.9 mm |
| 9 | 15.9 mm | 15.9 mm |
| 8* | 15.95 mm* | 15.9 mm |
| 7 | 16.1 mm | 15.95 mm |
| 6* | 16.4 mm | 16.0 mm* |

TABLE 3-continued

| Compression molding time at 200° C. (in secs/mm- final thickness of the chipboard) | Board thickness after compression molding | |
|---|---|---|
| | without catalyst | 1% of catalyst |
| 5.5 | inadequately hardened | 16.4 mm |

\* = minimum compression molding time

EXAMPLE 4

As in Example 1, the center layer chips are sprayed with a polyisocyanate-water emulsion prepared as follows:

110 parts of water are stirred with 40 parts of a 50% paraffin dispersion into which 130 parts of an MDI-based polyisocyanate (Bayer PU 1520 A) containing 1 and 2% by weight of a 50% solution of catalysts I and II in diethylene glycol mono-n-butyl ether are emulsified in 30 seconds by means of a high-speed stirrer. Further processing is carried out as described in Example 1. The results are shown in Table 4 below.

TABLE 4

| V 100 transverse tensile strength (MPa) | | |
|---|---|---|
| Catalyst solution in the center layer (% by weight, based on polyisocyanate) | Compression molding time at 170° C. | |
| | 3.2 mins | 1.6 mins |
| without catalyst (comparison) | 0.28 MPa | 0.21 MPa |
| 0.5% of catalyst I | 0.28 MPa | 0.26 MPa |
| 1.0% of catalyst II | 0.31 MPa | 0.25 MPa |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of compression-molded materials by the compression molding of lignocellulose-containing materials mixed and/or impregnated with polyisocyanates as binder in the presence of catalysts, the improvemet wherein the catalysts used are latet, heat-activatable catalysts based on ammonium salts of the type which are obtained by reacting
   (i) monofunctional or polyfunctional, tertiary amines with
   (ii) alkyl esters of acids of phosphorus having alkylating properties, such that virtually all of the amine nitrogen atoms of component (i) have been alkylated by said ester.

2. The process of claim 1 wherein the components (i) and (ii) are reacted in substantially equivalent ratios of alkyl esters to tertiary amine nitrogen atoms.

3. A process as claimed in claim 1, characterized in that, in the case of multilayer compression-molded materials, only the center layer is activated with the catalysts according to the invention.

4. A process as claimed in claim 1, characterized in that the polyisocyanate is used in combination with polyols in an NCO:OH ratio of from 1.1:1 to 10:1.

5. A process as claimed in claim 1, characterized in that other catalysts known from polyurethane chemistry are used in addition to the catalysts according to the invention.

6. A process as claimed in claim 1, characterized in that urea/formaldehyde and/or melamine/formaldehyde and/or phenol/formaldehyde resins are used in addition to polyisocyanate binders.

7. A process as claimed in claim 1, characterized in that auxiliaries and additives, release agents, wood preservatives, flameproofing agents or polyethylene dispersions are used.

8. A process as claimed in claim 1, characterized in that the catalysts according to the invention are formulated in the polyisocyanate and/or polyols for the production of compression-molded materials by the compression molding of a mass of size-reduced organic and/or inorganic raw materials.

9. A process as claimed in claim 1, characterized in that catalyst components (i) and (ii) are separately formulated in the starting materials and the catalysts according to the invention are only formed during mixing of the starting components.

10. A process as claimed in claim 1, characterized in that the catalysts according to the invention are used for the production of wood chipboards.

11. A process as claimed in claim 1, characterized in that reaction products of methane phosphonic acid dialkyl esters with trialkylamines are used.

12. A process as claimed in claim 1, characterized in that reaction products of N-methyl pyrrolidine, triethylenediamine, N-methylmorpholine, 1,8-diazabicyclo-undec-7-ene, 1,5-diaza-bicyclo-non-5-ene, tributylamine, tris (β-hydroxyethyl)amine, N-methyl-N-dibutylamine and triethylamine with methyl phosphonic acid dimethyl ester, or triethyl phosphate are used.

* * * * *